US011332067B2

(12) United States Patent
Takeda et al.

(10) Patent No.: US 11,332,067 B2
(45) Date of Patent: May 17, 2022

(54) MANAGEMENT SYSTEM FOR WORK VEHICLE AND MANAGEMENT METHOD FOR WORK VEHICLE

(71) Applicant: Komatsu Ltd., Tokyo (JP)

(72) Inventors: Koji Takeda, Tokyo (JP); Akiharu Nishijima, Tokyo (JP)

(73) Assignee: Komatsu Ltd., Tokyo (JP)

( * ) Notice: Subject to any disclaimer, the term of this patent is extended or adjusted under 35 U.S.C. 154(b) by 165 days.

(21) Appl. No.: 16/317,107

(22) PCT Filed: Sep. 21, 2017

(86) PCT No.: PCT/JP2017/034145
§ 371 (c)(1),
(2) Date: Jan. 11, 2019

(87) PCT Pub. No.: WO2018/056372
PCT Pub. Date: Mar. 29, 2018

(65) Prior Publication Data
US 2019/0241119 A1 Aug. 8, 2019

(30) Foreign Application Priority Data
Sep. 23, 2016 (JP) .............................. JP2016-186328

(51) Int. Cl.
*B60W 50/14* (2020.01)
*G05D 1/00* (2006.01)
(Continued)

(52) U.S. Cl.
CPC ............... *B60Q 1/346* (2013.01); *B60Q 1/26* (2013.01); *G05D 1/02* (2013.01)

(58) Field of Classification Search
CPC ............. B60Q 1/346; B60Q 1/26; G05D 1/02
See application file for complete search history.

(56) References Cited

U.S. PATENT DOCUMENTS 6,125,324 A * 9/2000 Matsuda ................. G01C 21/26
701/409
6,246,932 B1 * 6/2001 Kageyama ........... G05D 1/0297
340/992

(Continued)

FOREIGN PATENT DOCUMENTS

JP SHO 62-98600 * 6/1987
JP S64-3917 U 1/1989

(Continued)

OTHER PUBLICATIONS

International Search Report dated Dec. 12, 2017, issued for PCT/JP2017/034145.

(Continued)

*Primary Examiner* — Yonel Beaulieu
(74) *Attorney, Agent, or Firm* — Locke Lord LLP

(57) ABSTRACT

A management system for a work vehicle, includes: a traveling condition data generation unit configured to generate traveling condition data of a work vehicle having a notification device configured to notify a moving direction; a notification data generation unit configured to generate notification data for controlling the notification device such that, based on the traveling condition data, the notification device operates in a first state at a time of moving forward of the work vehicle, and the notification device operates in a second state different from the first state at a time of moving backward of the work vehicle; and an output unit configured to output the notification data, to the work vehicle.

4 Claims, 12 Drawing Sheets

(51) Int. Cl.
   *B60Q 1/34*   (2006.01)
   *G05D 1/02*   (2020.01)
   *B60Q 1/26*   (2006.01)

(56) References Cited

U.S. PATENT DOCUMENTS

| | | | |
|---|---|---|---|
| 8,386,110 | B2 | 2/2013 | Maekawa et al. |
| 9,037,338 | B2 | 5/2015 | Osagawa et al. |
| 10,155,543 | B2 | 12/2018 | Uranaka et al. |
| 10,343,595 | B2 * | 7/2019 | Ogihara ................ B60Q 1/346 |
| 2010/0076640 | A1 | 3/2010 | Maekawa et al. |
| 2015/0323935 | A1 | 11/2015 | Doerksen |
| 2016/0046306 | A1 | 2/2016 | Miyajima |
| 2017/0066480 | A1 | 3/2017 | Uranaka et al. |
| 2017/0120804 | A1 * | 5/2017 | Kentley ................ B60W 30/08 |
| 2017/0174123 | A1 | 6/2017 | Ogihara et al. |
| 2020/0284883 | A1 * | 9/2020 | Ferreira ................ G01S 7/484 |
| 2021/0094577 | A1 * | 4/2021 | Shalev-Shwartz ........ G06T 7/20 |

FOREIGN PATENT DOCUMENTS

| | | | |
|---|---|---|---|
| JP | H02-96809 | A | 4/1990 |
| JP | 2002-321179 | A | 11/2002 |
| JP | 2005-292915 | A | 10/2005 |
| JP | 2010-73080 | A | 4/2010 |
| JP | 2012-113429 | A | 6/2012 |
| JP | 2016-134019 | A | 7/2016 |
| KR | 20160024302 | A * | 3/2016 |
| WO | 2014/155733 | A1 | 10/2014 |
| WO | 2015/129004 | A1 | 9/2015 |
| WO | 2016/093372 | A1 | 6/2016 |

OTHER PUBLICATIONS

"Interpretation Criteria for Technical Regulatory Standards on Japanese Railways", Railway Bureau Ministry of Land, Infrastructure, Transport and Tourism, Partial English translation.

* cited by examiner

MANAGEMENT SYSTEM FOR WORK VEHICLE AND MANAGEMENT METHOD FOR WORK VEHICLE

FIELD

The present invention relates to a management system for a work vehicle and a management method for a work vehicle.

BACKGROUND

In a wide-area work site like a mine, a work vehicle traveling unmanned is used for transportation work. Patent Literature 1 discloses a technique for an unmanned vehicle operating in a mine.

CITATION LIST

Patent Literature

Patent Literature 1: Japanese Laid-open Patent Publication No. 2012-113429

SUMMARY

Technical Problem

Both unmanned vehicles and manned vehicles may operate at the same work site. The unmanned vehicle moves forward or backward. If it is possible to grasp the moving direction of the unmanned vehicle, work at the work site can be smoothly carried out.

An aspect of the present invention is to provide a management system for a work vehicle and a management method for a work vehicle capable of grasping the moving direction of a work vehicle traveling unmanned.

Solution to Problem

According to a first aspect of the present invention, a management system for a work vehicle, comprises: a traveling condition data generation unit configured to generate traveling condition data of a work vehicle having a notification device configured to notify a moving direction; a notification data generation unit configured to generate notification data for controlling the notification device such that, based on the traveling condition data, the notification device operates in a first state at a time of moving forward of the work vehicle, and the notification device operates in a second state different from the first state at a time of moving backward of the work vehicle; and an output unit configured to output the notification data to the work vehicle.

According to a second aspect of the present invention, a management method for a work vehicle, comprises: generating traveling condition data of a work vehicle having a notification device configured to notify a moving direction; generating notification data for controlling the notification device such that, based on the traveling condition data, the notification device operates in a first state at a time of moving forward of the work vehicle, and the notification device operates in a second state different from the first state at a time of moving backward of the work vehicle; and outputting the notification data to the work vehicle.

Advantageous Effects of Invention

According to an aspect of the present invention, there is provided a management system for a work vehicle and a management method for a work vehicle capable of grasping the moving direction of a work vehicle traveling unmanned.

DESCRIPTION OF EMBODIMENTS

Hereinafter, embodiments of the present invention will be described with reference to the drawings; however, the present invention is not limited thereto. The constituent elements of the embodiments described below can be appropriately combined. In addition, some constituent elements may not be used.

First Embodiment

[Management System]

Figure 1:
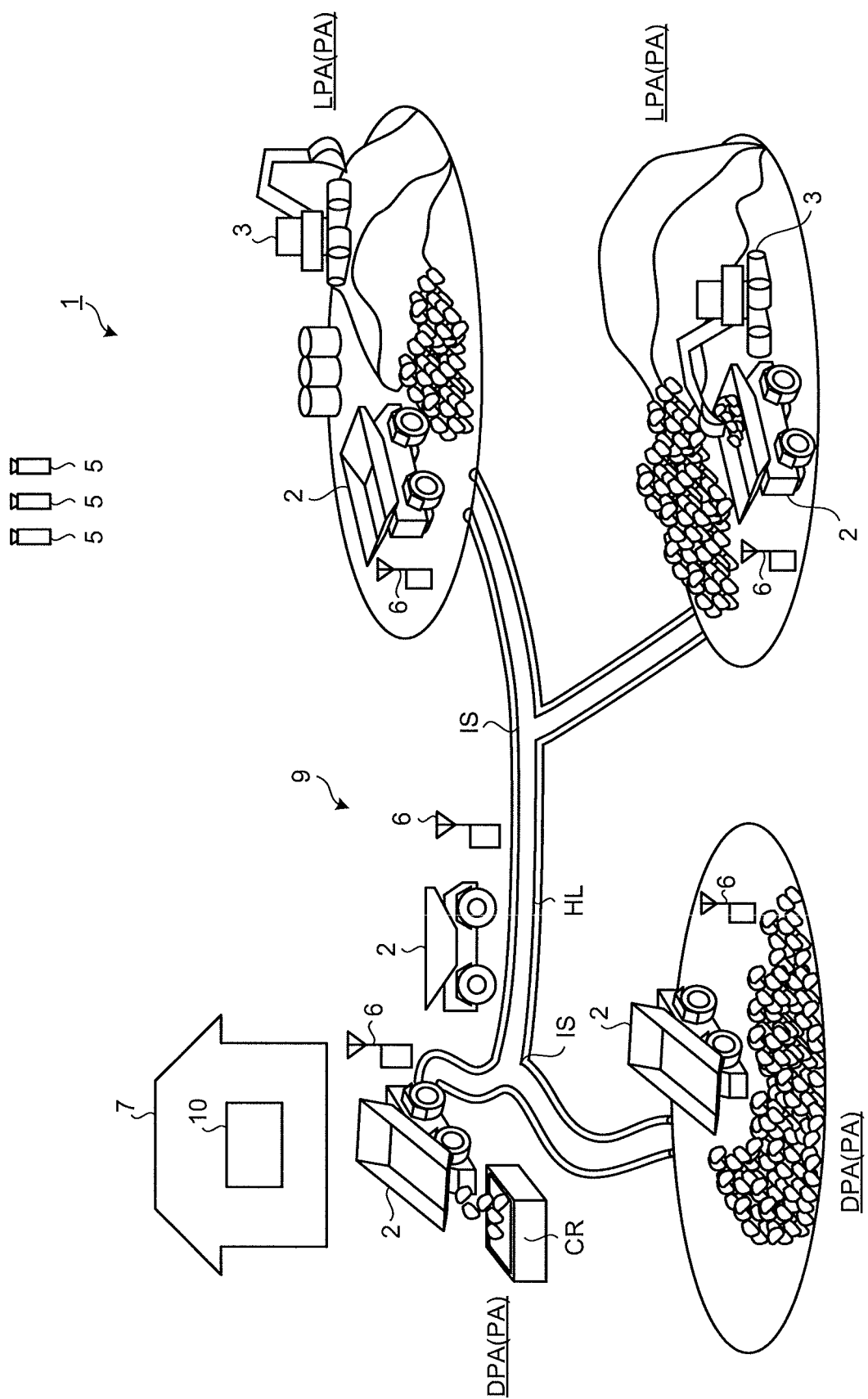
FIG. 1 is a diagram schematically illustrating one example of a management system for a work vehicle according to a first embodiment.

FIG. 1 is a diagram schematically illustrating one example of a management system 1 for a work vehicle 2 according to a first embodiment. The management system 1 implements operation management of the work vehicle 2. In the present embodiment, the work vehicle 2 is a dump truck 2 that is a transport vehicle capable of traveling through a mine.

As illustrated in FIG. 1, the dump truck 2 travels in at least a part of a mine workplace PA and a conveying path HL leading to the workplace PA. The workplace PA includes at least one of a loading place LPA and a discharging place DPA. The conveying path HL includes an intersection IS. The dump truck 2 travels according to a target traveling route set in the conveying path HL and the workplace PA.

The loading place LPA is an area where a loading operation of loading a load onto the dump truck 2 is performed. In the loading place LPA, a loading machine 3 such as an excavator operates. The discharging place DPA is an area where a discharge operation of discharging the load from the dump truck 2 is performed. For example, a crusher CR is provided in the discharging place DPA.

The management system 1 includes a management apparatus 10 and a communication system 9. The management apparatus 10 includes a computer system and is installed in a control facility 7 provided in the mine. The communication system 9 performs data communication and signal communication between the management apparatus 10 and the dump truck 2. The communication system 9 has a plurality of repeaters 6 that relays data and signals. The management apparatus 10 and the dump truck 2 wirelessly communicate with each other via the communication system 9.

In the present embodiment, the dump truck 2 is an unmanned dump truck traveling through the mine based on a command signal from the management apparatus 10. The dump truck 2 travels through the mine based on the command signal from the management apparatus 10 without depending on the operator's operation.

In the present embodiment, a position of the dump truck 2 is detected using a global navigation satellite system (GNSS). The global navigation satellite system includes a global positioning system (GPS). The GNSS has a plurality of positioning satellites 5. The GNSS detects a position defined by latitude, longitude, and altitude coordinate data. The position detected by the GNSS is an absolute position defined in the global coordinate system. By GNSS, the absolute position of the dump truck 2 at the mine is detected.

[Dump Truck]

Figure 2:
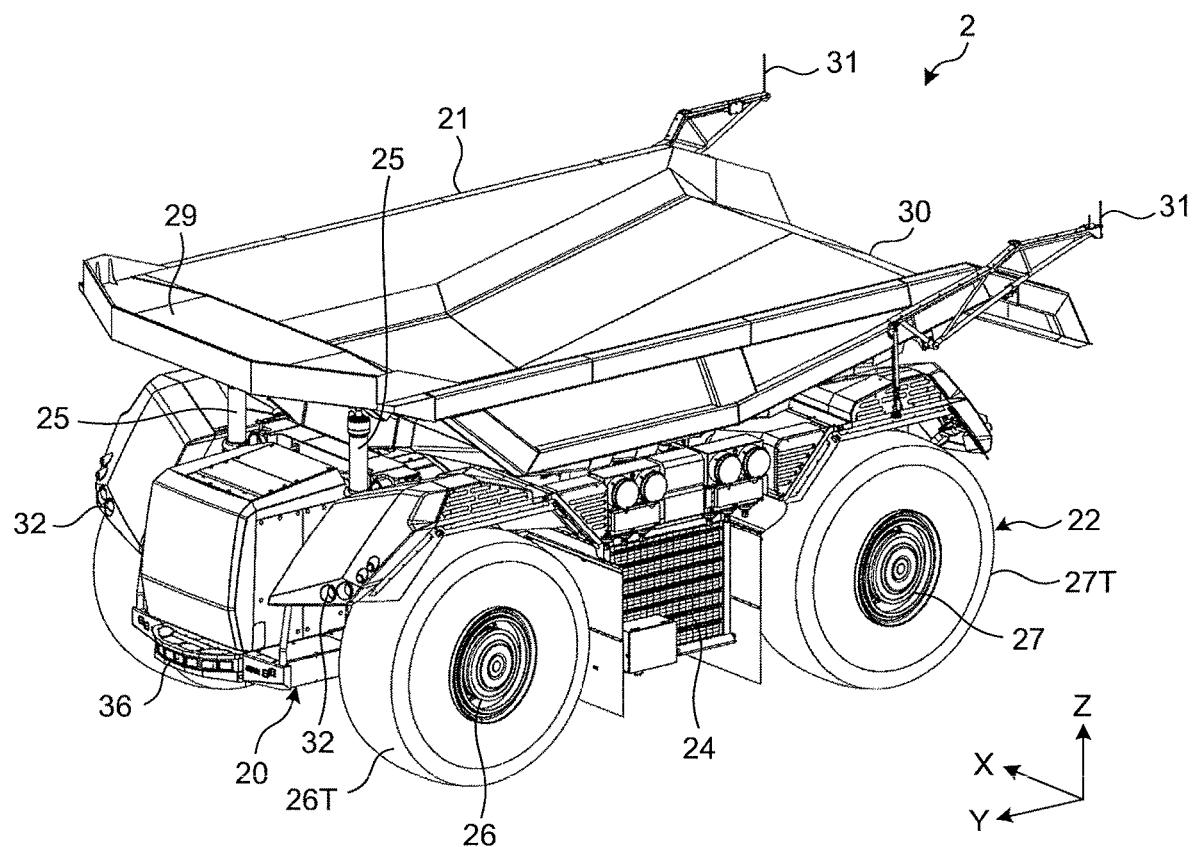
FIG. 2 is a perspective view of the work vehicle according to the first embodiment as viewed from the front.
Figure 3:
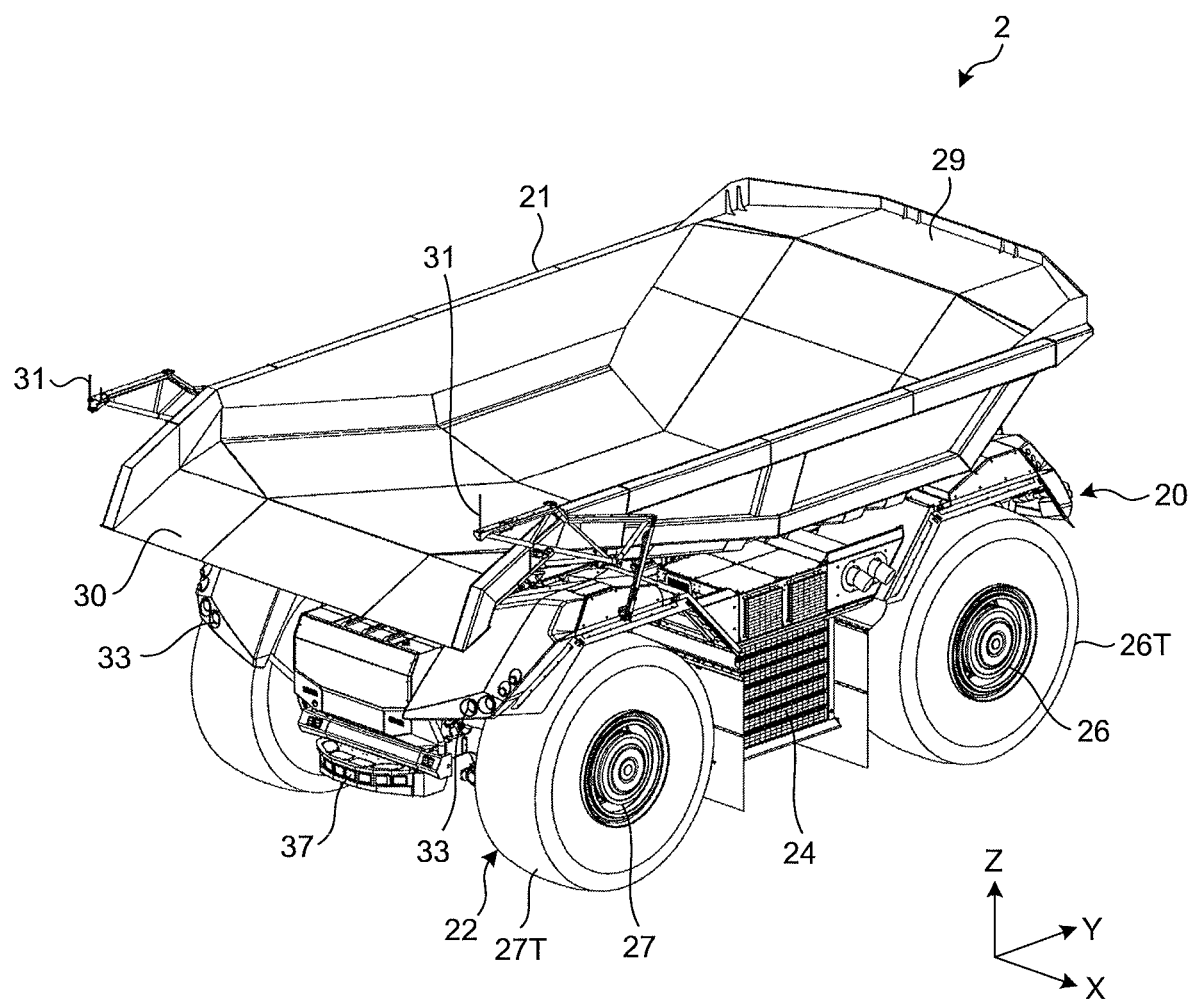
FIG. 3 is a perspective view of the work vehicle according to the first embodiment as viewed from the rear.
Figure 4:
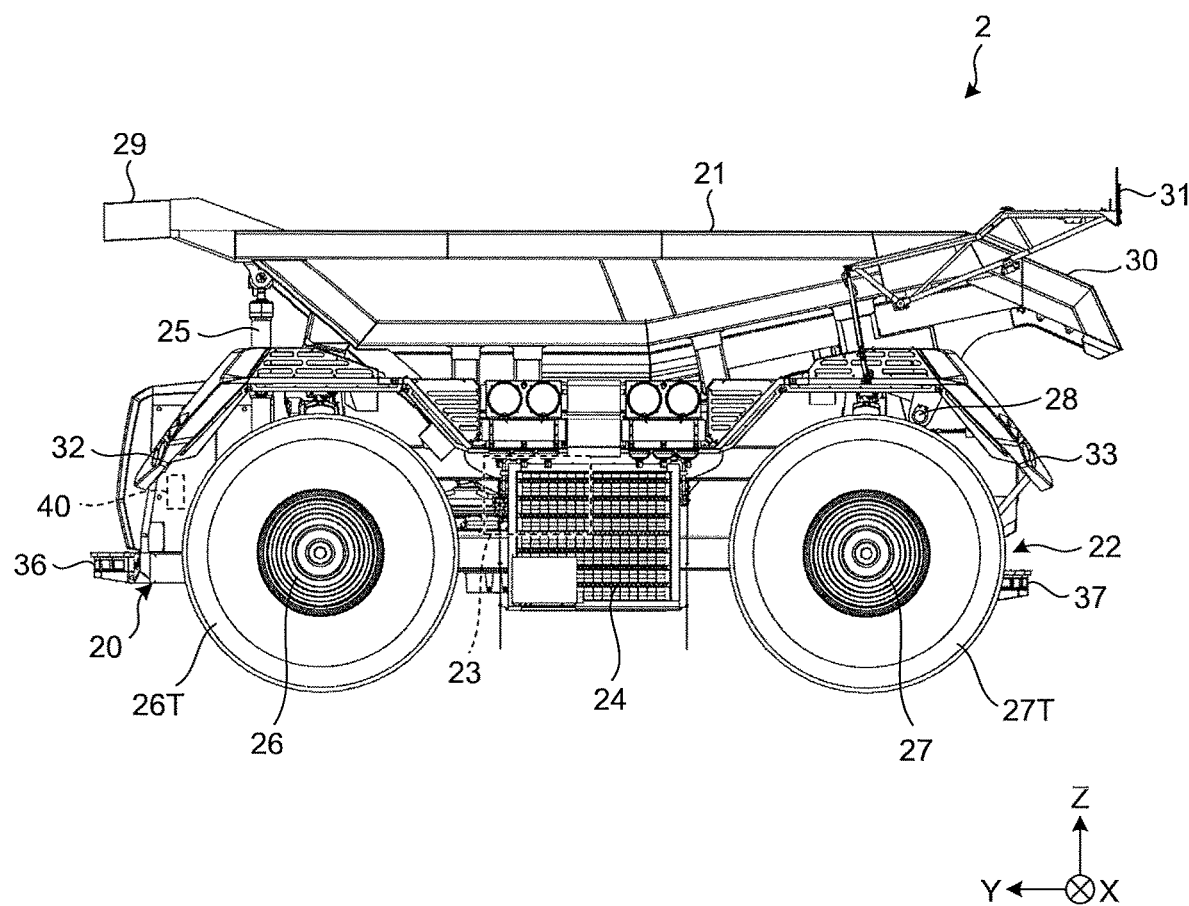
FIG. 4 is a side view illustrating the work vehicle according to the first embodiment.

Next, the dump truck 2 according to the present embodiment will be described. FIG. 2 is a perspective view of the dump truck 2, according to the present embodiment as viewed from the front. FIG. 3 is a perspective view of the dump truck 2 according to the present embodiment as viewed from the rear. FIG. 4 is a side view illustrating the dump truck 2 according to the present embodiment. In explanation using FIGS. 2, 3, and 4, the XYZ orthogonal coordinate system is set and the positional relationship of each part will be described with reference to the XYZ orthogonal coordinate system.

In the explanation using FIGS. 2, 3, and 4, the Y-axis direction is defined as a traveling direction of the dump truck 2, the +Y direction is defined as a forward movement direction of the dump truck 2, and the −Y direction is defined as a backward movement direction of the dump truck 2. Furthermore, in the traveling direction, a portion or a direction on the +Y side of the dump truck 2 is appropriately referred to as a front portion or a front side, and a portion or a direction on the −Y side of the dump truck 2 is appropriately referred to as a rear portion or a rear side. Furthermore, the X-axis direction is defined as a vehicle width direction of the dump truck 2, and in the vehicle width direction, a portion or a direction on the +X side of the dump truck 2 is appropriately referred to as a right portion or a right side, and a portion or a direction on the −X side of the dump truck 2 is appropriately referred to as a left portion or a left side. Furthermore, the Z-axis direction is defined as a longitudinal direction of the dump truck 2, and in the longitudinal direction, a portion or a direction on the +Z side of the dump truck 2 is appropriately referred to as an upper portion or an upper side, and a portion or a direction on the −Z side of the dump truck 2 is appropriately referred to as a lower portion lower or a lower side.

The dump truck 2 includes a chassis 20, a dump body 21 supported by the chassis 20, a traveling device 22 that supports the chassis 20, a drive device 23 that generates motive power for operating the traveling device 22, a radiator 24, a hoist cylinder 25 that drives the dump body 21, and a control apparatus 40.

In the present embodiment, the dump truck 2 is a cabless dump truck having no cab (operation cab). The dump truck 2 travels unmanned without depending on the operator's operation. The dump truck 2 may be a dump truck having a cab and traveling unmanned.

The traveling device 22 has a wheel 26 provided at the front portion of the dump truck 2 and supporting a tire 26T, a wheel 27 provided at the rear portion of the dump truck 2 and supporting a tire 27T, a brake device that brakes the wheel 26 and the wheel 27, and a steering device that steers the wheel 26 and the wheel 27. One wheel 26 and one tire 26T are provided for each of the right portion and the left portion of the chassis 20. One wheel 27 and one tire 27T are provided for each of the right portion and the left portion of the chassis 20.

The wheel 26 and the wheel 27 are supported by the chassis 20 via a suspension. As the wheel 26 and the wheel 27 rotate, the dump truck 2 travels.

The drive device 23 generates motive power for rotating the wheel 26 and the wheel 27. In the present embodiment, the drive device 23 includes an internal combustion engine, a generator that generates electric power by operation of the internal combustion engine, and an electric motor that operates based on the electric power generated by the generator. The radiator 24 radiates heat from coolant of the internal combustion engine.

The wheel 26 and the wheel 27 are rotated by motive power generated by the electric motor. The electric motor is an in-wheel motor and is provided for each of the wheel 26 and the wheel 27. When the internal combustion engine is driven, the generator operates to generate the electric power. The electric motor is driven by the electric power generated by the generator. The electric motor is provided for each of the two wheels 26. Furthermore, the electric motor is provided for each of the two wheels 27. That is, in the present embodiment, the traveling device 22 is a four-wheel drive type traveling device.

The wheel 26 is steered by a first steering device. The wheel 27 is steered by a second steering device. That is, in the present embodiment, the traveling device 22 is a four-wheel steering type traveling device.

The dump truck 2 is movable forward and backward. It is preferable that the traveling performance of the dump truck 2 at the time of forward movement is substantially the same as the traveling performance of the dump truck 2 at the time of backward movement. That is, at least one of the driving performance, the braking performance, and the swinging performance of the traveling device 22 at the time of forward movement is substantially the same as at least one of the driving performance, the braking performance, and the swinging performance of the traveling device 22 at the time of backward movement. For example, the maximum traveling speed of the dump truck 2 at the time of forward movement is substantially the same as the maximum traveling speed of the dump truck 2 at the time of backward movement. The maximum acceleration of the dump truck 2 at the time of forward movement is substantially the same as the maximum acceleration of the dump truck 2 at the time of backward movement.

The dump body 21 accommodates the load. The dump body 21 is rotatably supported at the rear portion of the chassis 20 via a hinge mechanism 28. The dump body 21 has a protrusion 29 at the front portion and an inclined surface 30 at the rear portion.

The hoist cylinder 25 drives the dump body 21. Two hoist cylinders 25 are provided in the vehicle width direction. An upper end of the hoist cylinder 25 is rotatably connected to the front portion of the dump body 21. A lower end of the hoist cylinder 25 is rotatably connected to the chassis 20.

The dump body 21 dumps by the operation of the hoist cylinder 25. As the hoist cylinder 25 extends, the dump body 21 rotates around the hinge mechanism 28 such that the front portion of the dump body 21 rises. As the dump body 21 dumps, the load loaded on the dump body 21 is discharged from the rear portion of the dump body 21.

The control apparatus 40 includes a computer system. The control apparatus 40 controls the dump truck 2 based on a command signal including traveling condition data supplied from the management apparatus 10.

The dump truck 2 has a position detector 31 that detects the absolute position of the dump truck 2, an illumination lamp 32 provided at the front portion, an illumination lamp 33 provided at the rear portion, an obstacle sensor 36 provided at the front portion, and an obstacle sensor 37 provided at the rear portion.

The position detector 31 includes a GPS antenna that receives a GPS signal from the positioning satellite 5 and a GPS calculator that calculates the absolute position of the dump truck 2 based on the GPS signal received by the GPS antenna. The GPS antenna of the position detector 31 is provided at the rear portion of the dump body 21.

The illumination lamp 32 illuminates an object ahead of the dump truck 2. The illumination lamp 33 illuminates an object behind the dump truck 2.

The obstacle sensor 36 detects an obstacle ahead of the dump truck 2 when the dump truck 2 moves forward. The obstacle sensor 37 detects an obstacle behind the dump truck 2 when the dump truck 2 moves backward. The obstacle sensor 36 and the obstacle sensor 37 include, for example, a radar device. Noted that the obstacle sensor 36 and the obstacle sensor 37 may include a laser scanner or a camera. When the obstacle sensor 36 detects an obstacle at the time of forward movement of the dump truck 2, the control apparatus 40 performs processing for preventing a collision between the dump truck 2 and the obstacle, based on detection data of the obstacle sensor 36. When the obstacle sensor 37 detects an obstacle at the time of backward movement of the dump truck 2, the control apparatus 40 performs processing for preventing a collision between the dump truck 2 and the obstacle, based on detection data of the obstacle sensor 37. The processing for preventing a collision between the dump truck 2 and an obstacle is, for example, processing of decelerating or stopping the traveling dump truck 2.

[Management Apparatus and Control Apparatus]

Figure 5:
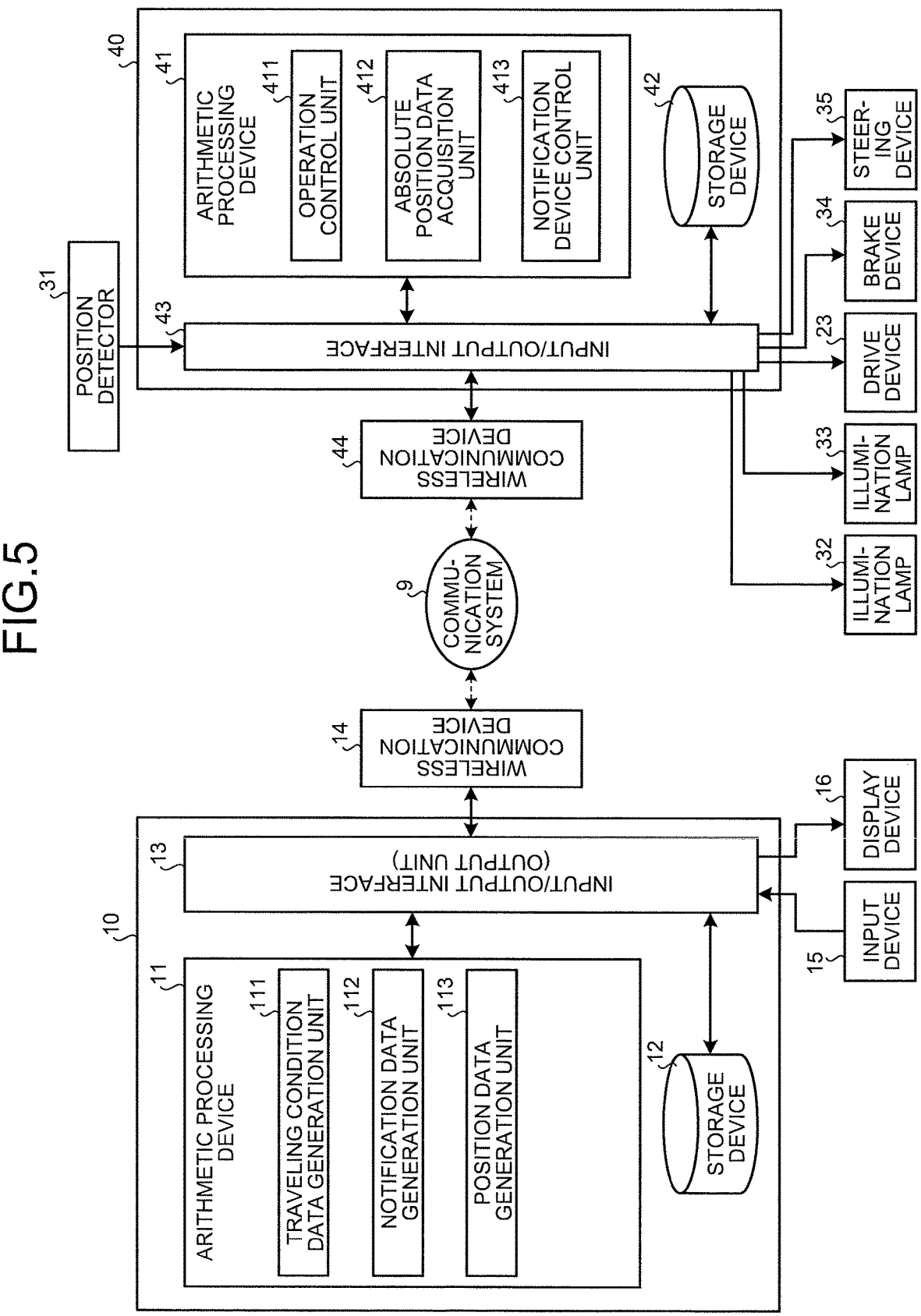
FIG. 5 is a functional block diagram illustrating one example of a management apparatus and a control apparatus according to the first embodiment.

Next, the management apparatus 10 and the control apparatus 40 according to the present embodiment will be described. FIG. 5 is a functional block diagram illustrating one example of the management apparatus 10 and the control apparatus 40 according to the present embodiment. As described above, the management apparatus 10 is installed in the control facility 7. The control apparatus 40 is mounted on the dump truck 2. The management apparatus 10 and the control apparatus 40 wirelessly communicate via the communication system 9.

The management apparatus 10 includes a computer system. The management apparatus 10 has an arithmetic processing device 11 including a processor such as a central processing unit (CPU), a storage device 12 including a memory and storage such as a read only memory (ROM) or a random access memory (RAM), and an input/output interface 13.

The management apparatus 10 is connected to a wireless communication device 14. The management apparatus 10 performs data communication with the dump truck 2 via the wireless communication device 14 and the communication system 9.

The management apparatus 10 is connected to an input device 15 and an output device 16. The input device 15 and the output device 16 are installed in the control facility 7. The input device 15 includes at least one of a keyboard, a mouse, and a touch panel for a computer, for example. Input data generated by operating the input device 15 is output to the management apparatus 10. The output device 16 includes a display device. The display device includes a flat panel display such as a liquid crystal display (LCD) or an organic electroluminescence display (OELD). The output device 16 operates based on display data output from the management apparatus 10. The output device 16 may be, for example, a printer.

The arithmetic processing device 11 has a traveling condition data generation unit 111, a notification data generation unit 112, and a position data acquisition unit 113.

The traveling condition data generation unit 111 generates traveling condition data of the dump truck 2 traveling through the mine. The traveling condition data of the dump truck 2 includes at least one of a traveling route, a traveling speed, acceleration, deceleration, and a moving direction of the dump truck 2. In addition, the traveling condition data of the dump truck 2 may include at least one of a stopping position and a departure position of the dump truck 2.

In the present embodiment, the traveling condition data generation unit 111 sets traveling condition data including at least a first traveling route RPa for making the dump truck 2 travel forward and a second traveling route RPb for making the dump truck 2 travel backward in the conveying path HL.

It is preferable that the traveling condition data generation unit 111 generates the traveling condition data such that the first traveling route RPa and the second traveling route RPb do not overlap in the workplace PA and the conveying path HL.

Based on the traveling condition data generated by the traveling condition data generation unit 111, the notification data generation unit 112 generates notification data for controlling a notification device provided on the dump truck 2. The notification device is a notification device that can notify the moving direction of the dump truck 2.

In the present embodiment, the notification device includes the illumination lamp 32 provided at the front portion of the dump truck 2 and the illumination lamp 33 provided in the rear portion of the dump truck 2. The notification data generation unit 112 generates the notification data such that a lighting state of the illumination lamp 32 and a lighting state of the illumination lamp 33 are different between the forward movement and the backward movement of the dump truck 2.

The position data acquisition unit 113 acquires position data indicating the absolute position of the dump truck 2. As described above, the absolute position of the dump truck 2 is detected by the position detector 31. Detection data of the position detector 31 is transmitted to the management apparatus 10 via the communication system 9. The position data acquisition unit 113 acquires the position data of the dump truck 2 via the communication system 9.

The input/output interface 13 outputs the traveling condition data generated by the traveling condition data generation unit 111 to the dump truck 2. Furthermore, the input/output interface 13 outputs the notification data generated by the notification data generation unit 112 to the dump truck 2. The input/output interface 13 functions as an output unit that outputs the traveling condition data and the notification data to the dump truck 2. The traveling condition data and the notification data generated by the arithmetic processing device 11 are output to the dump truck 2 via the input/output interface 13 and the communication system 9.

The control apparatus 40 includes a computer system. The control apparatus 40 has an arithmetic processing device 41 including a processor such as a central processing unit (CPU), a storage device 42 including a memory and storage such as a read only memory (ROM) or a random access memory (RAM), and an input/output interface 43.

The control apparatus 40 is connected to a wireless communication device 44. The control apparatus 40 performs data communication with the management apparatus 10 via the wireless communication device 44 and the communication system 9.

The control apparatus 40 is connected to the position detector 31, the drive device 23, a brake device 34, a steering device 35, the illumination lamp 32, and the illumination lamp 33. The position detector 31, the drive device 23, the brake device 34, the steering device 35, the illumination lamp 32, and the illumination lamp 33 are mounted on the dump truck 2.

As described above, the position detector 31 detects the absolute position of the dump truck 2. The drive device 23 operates in order to drive the traveling device 22 of the dump truck 2. The brake device 34 operates in order to brake the traveling device 22 of the dump truck 2. The steering device 35 operates in order to steer the traveling device 22 of the dump truck 2.

The arithmetic processing device 41 has an operation control unit 411, an absolute position data acquisition unit 412, and a notification device control unit 413.

The operation control unit 411 outputs an operation control signal for controlling at least one of the drive device 23, the brake device 34, and the steering device 35 of the dump truck 2, based on the traveling condition data supplied from the management apparatus 10. The operation control signal includes an accelerator command signal output to the drive device 23, a brake command signal output to the brake device 34, and a steering command signal output to the steering device 35.

The absolute position data acquisition unit 412 acquires the absolute position data of the dump truck 2 from the detection data of the position detector 31.

The notification device control unit 413 outputs a control signal for controlling the notification device of the dump truck 2, based on the notification data supplied from the management apparatus 10. In the present embodiment, the notification device control unit 413 outputs a control signal for controlling the lighting state of the illumination lamp 32 of the dump truck 2 and a control signal for controlling the lighting state of the illumination lamp 33, based on the notification data supplied from the management apparatus 10.

[Traveling Condition Data]

Figure 6:
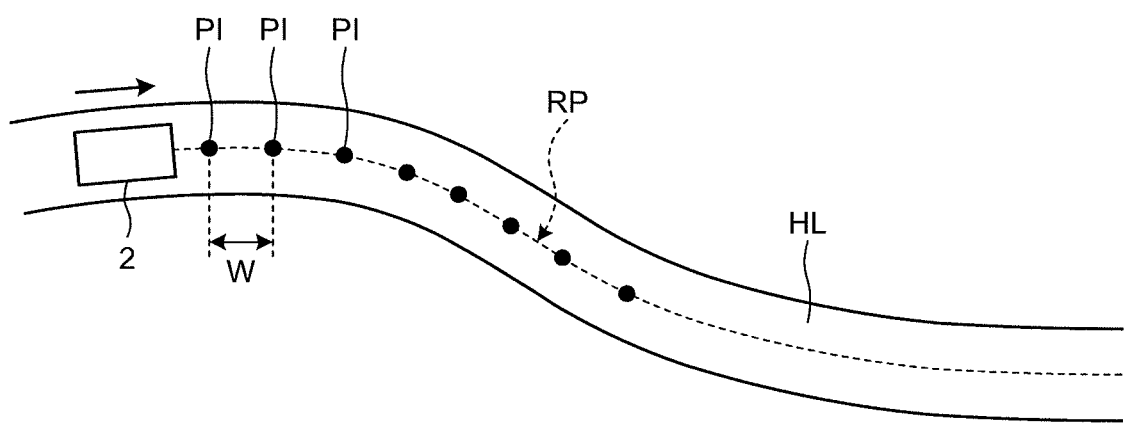
FIG. 6 is a diagram schematically illustrating traveling condition data according to the first embodiment.

Next, the traveling condition data according to the present embodiment will be described. FIG. 6 is a diagram schematically illustrating the traveling condition data according to the present embodiment. FIG. 6 illustrates one example of the traveling condition data defined in the conveying path HL.

As illustrated in FIG. 6, the traveling condition data includes an aggregate of a plurality of course points PI set at a constant interval W.

Each of the plurality of course points PI includes target absolute position data of the dump truck 2, target traveling speed data of the dump truck 2 at the position where the course point PI is set, and target moving direction data of the dump truck 2 at the position where the course point PI is set.

A target traveling route RP of the dump truck 2 is defined by a trajectory passing through the plurality of course points PI. The target traveling speed of the dump truck 2 at the position where the course point PI is set is defined based on the target traveling speed data. The target moving direction of the dump truck 2 at the position where the course point PI is set is defined based on the target moving direction data.

In the present embodiment, each of the plurality of course points PI includes the notification data for controlling the notification device of the dump truck 2. The notification data generation unit 112 sets the notification data to each of the plurality of course points PI. The notification data is data for controlling an operation state of the notification device when the dump truck 2 passes through the position of the course point PI.

That is, in the present embodiment, each of the plurality of course points PI includes the target absolute position data, the target traveling speed data, the target moving direction data, and the notification data.

The notification data generation unit 112 generates the notification data such that the notification device operates in a first state when the dump truck 2 moves forward and the notification device operates in a second state different from the first state when the dump truck 2 moves backward. For example, in a case where the target moving direction data defined at a certain course point PI is target moving direction data for moving the dump truck 2 forward, the notification data defined at the course point PI is notification data for operating the notification device in the first state. In a case where the target moving direction data defined at a certain course point PI is target moving direction data for moving the dump truck 2 backward, the notification data defined at the course point PI is notification data for operating the notification device in the second state different from the first state.

The input/output interface 13 of the management apparatus 10 outputs the traveling condition data including the notification data, to the dump truck 2 via the wireless communication device 14. The management apparatus 10 outputs the traveling condition data including the plurality of course points PI ahead of the dump truck 2 in the moving direction, to the dump truck 2. The dump truck 2 travels through the mine according to the traveling condition data transmitted from the management apparatus 10. Furthermore, the dump truck 2 controls the notification device including the illumination lamp 32 and the illumination lamp 33 according to the notification data transmitted from the management apparatus 10.

FIG. 6 illustrates one example of the traveling condition data set in the conveying path HL. In the workplace PA, the traveling condition data of the dump truck 2 is also set.

[Management Method]

Figure 7:
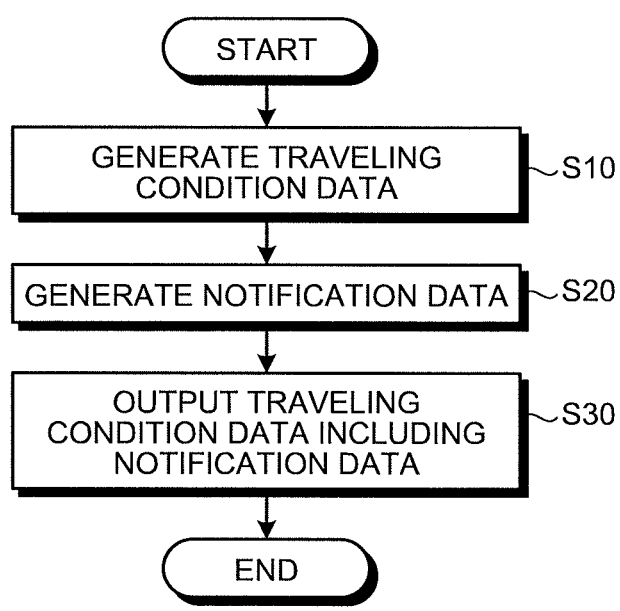
FIG. 7 is a flowchart illustrating one example of a management method for a work vehicle according to the first embodiment.
Figure 8:
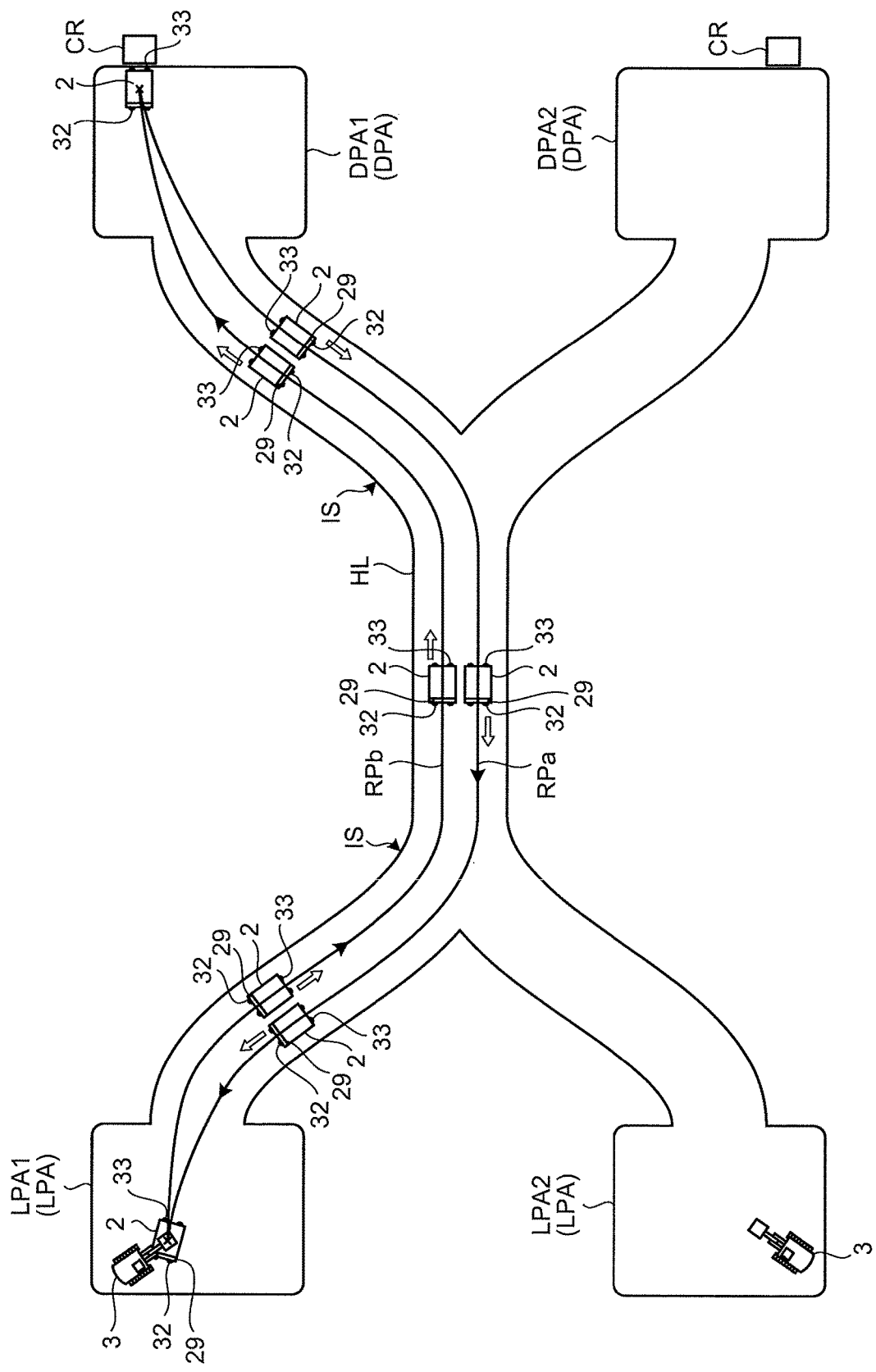
FIG. 8 is a schematic diagram for explaining the management method for a work vehicle according to the first embodiment.
Figure 9:
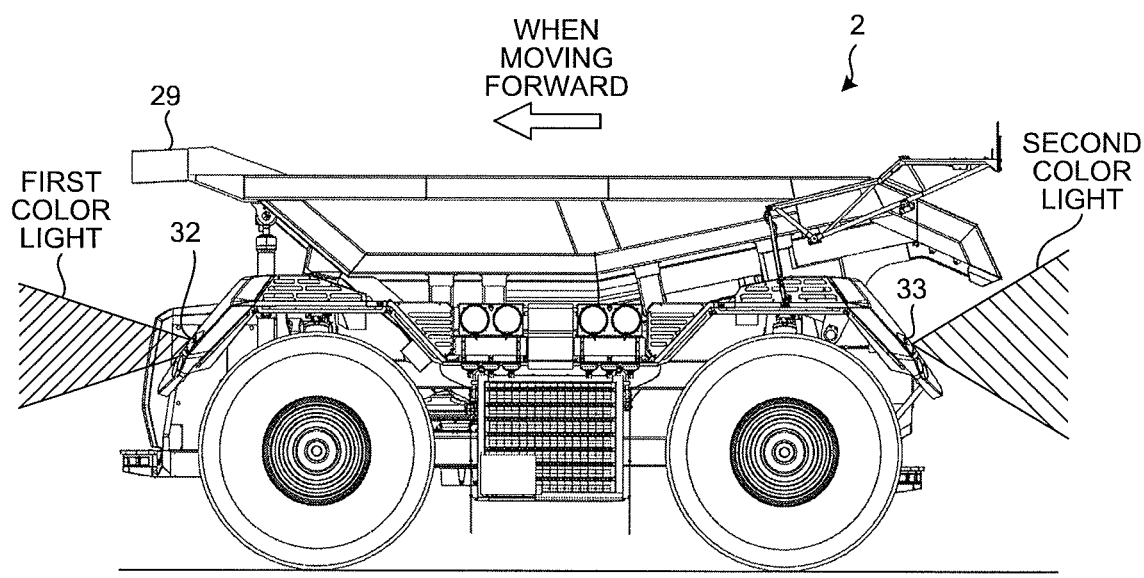
FIG. 9 is a schematic view for explaining the management method for a work vehicle according to the first embodiment.
Figure 10:
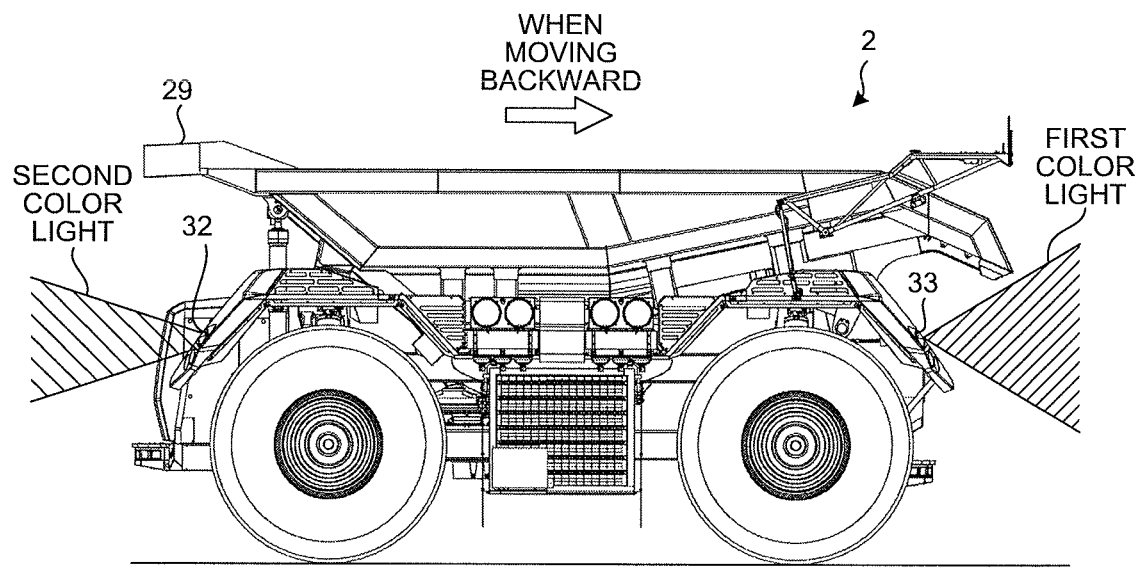
FIG. 10 is a schematic view for explaining the management method for a work vehicle according to the first embodiment.

Next, a management method for the dump truck 2 according to the present embodiment will be described. FIG. 7 is a flowchart illustrating one example of the management method for the dump truck 2 according to the present embodiment. FIGS. 8, 9, and 10 are a schematic diagram and views for explaining the management method for the dump truck 2 according to the present embodiment.

The traveling condition data generation unit 111 generates the traveling condition data of the dump truck 2 (step S10). The traveling condition data includes the first traveling route RPa for making the dump truck 2 travel forward and the second traveling route RPb for making the dump truck 2 travel backward, in the conveying path HL leading to the loading place LPA where the loading operation of the dump truck 2 is performed and the discharging place DPA where the discharge operation of the dump truck 2 is performed.

FIG. 8 illustrates one example of the traveling condition data according to the present embodiment. In the example illustrating in FIG. 8, a plurality of loading places LPA and a plurality of discharging place DPA are provided in the mine. In the example illustrated in FIG. 8, a first loading place LPA1 and a second loading place LPA2 are provided in the mine. In addition, a first discharging place DPA1 and a second discharging place DPA2 are provided in the mine.

As illustrated in FIG. 8, the first traveling route RPa for making the dump truck 2 travel forward and the second traveling route RPb for making the dump truck 2 travel backward are set in the conveying path HL. The dump truck 2 travels on the conveying path HL according to the first traveling route RPa and the second traveling route RPb.

FIG. 8 illustrates an example in which the traveling condition data is set such that the dump truck 2 travels back and forth between the first loading place LPA1 and the first discharging place DPA1. The dump truck 2 travels forward on the conveying path HL according to the first traveling route RPa and enters the first loading place LPA1. In the first loading place LPA1, the dump truck 2 is loaded with a load by the loading machine 3. After the loading operation in the first loading place LPA1 is completed, the dump truck 2 travels backward on the conveying path HL according to the second traveling route RPb and enters the first discharging place DPA1. The dump truck 2 discharges the load in the first discharging place DPA1. After the discharge operation in the first discharging place DPA1 is completed, the dump truck 2 travels forward on the conveying path HL according to the first traveling route RPa and enters the first loading place LPA1. In the first loading place LPA1, the dump truck 2 is loaded with a load by the loading machine 3. Subsequently, the same operation is repeated.

The notification data generation unit 112 generates the notification data for controlling the illumination lamp 32 and the illumination lamp 33, based on the traveling condition data generated by the traveling condition data generation unit 111 (step S20).

The traveling condition data generation unit 111 combines the notification data generated by the notification data generation unit 112 and the traveling condition data.

For example, in a case where the traveling condition data generation unit 111 sets the target moving direction data for moving the dump truck 2 forward, to a certain course point PI, the notification data generation unit 112 sets the notification data for operating the notification device in the first status, to the course point PI. In a case where the traveling condition data generation unit 111 sets the target moving direction data for moving the dump truck 2 backward, to a certain course point PI, the notification data generation unit 112 sets the notification data for operating the notification device in the second state, to the course point PI.

The input/output interface 13 of the management apparatus 10 outputs the traveling condition data including the notification data to the dump truck 2 (step S30). The dump truck 2 travels according to the traveling condition data.

FIG. 9 is a view schematically illustrating one example of the dump truck 2 at the time of forward movement. FIG. 10 is a view schematically illustrating one example of the dump truck 2 at the time of backward movement. As illustrated in FIG. 9, when the dump truck 2 moves forward, the illumination lamp 32 and the illumination lamp 33 functioning as the notification apparatus operate in the first state (first lighting state). As illustrated in FIG. 10, when the dump truck 2 moves backward, the illumination lamp 32 and the illumination lamp 33 functioning as the notification apparatus operate in the second state (second lighting state) different from the first state (first lighting state). In the present embodiment, when the dump truck 2 moves forward, the illumination lamp 32 operates in the first lighting state, and when the dump truck 2 moves backward, the illumination lamp 32 operates in the second lighting state different from the first lighting state. When the dump truck 2 moves forward, the illumination lamp 33 operates in the second lighting state, and when the dump truck 2 moves backward, the illumination lamp 33 operates in the first lighting state different from the second lighting state.

In the examples illustrated in FIGS. 9 and 10, the illumination lamp 32 emits first color light (for example, yellow light) at the time of forward movement of the dump truck 2, and the illumination lamp 33 emits second color light (for example, red light) different from the first color light. At the time of backward movement of the dump truck 2, the illumination lamp 32 emits the second color light (for example, red light), and the illumination lamp 33 emits the first color light (for example, yellow light).

In addition, at the time of forward movement of the dump truck 2, the illumination lamp 32 may emit light and the illumination lamp 33 may not emit light. At the time of backward movement of the dump truck 2, the illumination lamp 33 may emit light and the illumination lamp 32 may not emit light.

At the time of forward movement of the dump truck 2, the illumination lamp 32 may emit continuous light and the illumination lamp 33 may emit blinking light. At the time of backward movement of the dump truck 2, the illumination lamp 33 may emit continuous light and the illumination lamp 32 may emit blinking light.

Action and Effect

As described above, according to the present embodiment, the moving direction of the dump truck 2 is notified around the dump truck 2 by the notification device including the illumination lamp 32 and the illumination lamp 33 provided on the dump truck 2 where the traveling performance at the time of forward movement is substantially the same as the traveling performance at the time of backward movement. As a result, an operator of a manned vehicle around the dump truck 2 or a worker working at the mine can grasp the moving direction of the dump truck 2. Therefore, work in the mine is smoothly carried out, and workability and productivity of the mine are improved.

A conventional dump truck 2 has a cab. Thus, conventionally, the operator of the manned vehicle around the dump truck 2 or the worker working at the mine can grasp the moving direction of the dump truck 2 from the appearance of the dump truck 2. In the present embodiment, the dump truck 2 has no cab. Therefore, it is difficult for the operator of the manned vehicle around the dump truck 2 or the worker working at the mine to grasp the moving direction of the dump truck 2 from the appearance of the dump truck 2. In addition, at the mine, the dump truck 2 operates 24 hours a day; thus, especially at night, the operator of the manned vehicle around the dump truck 2 or the worker working at the mine is difficult to grasp the moving direction of the dump truck 2 from the appearance of the dump truck 2. According to the present embodiment, since the moving direction of the dump truck 2 is notified by the notification device, the operator of the manned vehicle around the dump truck 2 or the worker working at the mine can grasp the moving direction of the dump truck 2.

In addition, in the present embodiment, the notification data is given to each of the plurality of course points PI of the traveling condition data, so that it is possible to properly operate the notification device of the dump truck 2 traveling according to the traveling condition data.

Furthermore, in the present embodiment, the notification device emits light to notify the moving direction of the dump truck 2. As a result, the operator of the manned vehicle around the dump truck 2 or the worker working at the mine can visually recognize the moving direction of the dump truck 2.

Furthermore, in the present embodiment, the notification device includes the illumination lamp 32 provided at the front portion of the dump truck 2 and the illumination lamp 33 provided at the rear portion of the dump truck 2, and the notification data generation unit 112 generates the notification data such that the lighting state of the illumination lamp 32 and the lighting state of the illumination lamp 33 are different between the forward movement and the backward movement of the dump truck 2. In the present embodiment, at the time of forward movement and at the time of the backward movement of the dump truck 2, the illumination lamp 32 operates in the first lighting state and in the second lighting state different from the first lighting state, and the illumination lamp 33 operates in the second lighting state and in the first lighting state different from the second lighting state. As a result, both of an operator of a manned vehicle or a worker existing ahead of the dump truck 2 and an operator of a manned vehicle or a worker existing behind the dump truck 2 can visually recognize the moving direction of the dump truck 2.

Second Embodiment

A second embodiment will be described. In the following description, the same reference signs are given to constituent elements that are the same as or equivalent to those of the above embodiment, and the description thereof will be simplified or omitted.

Figure 11:
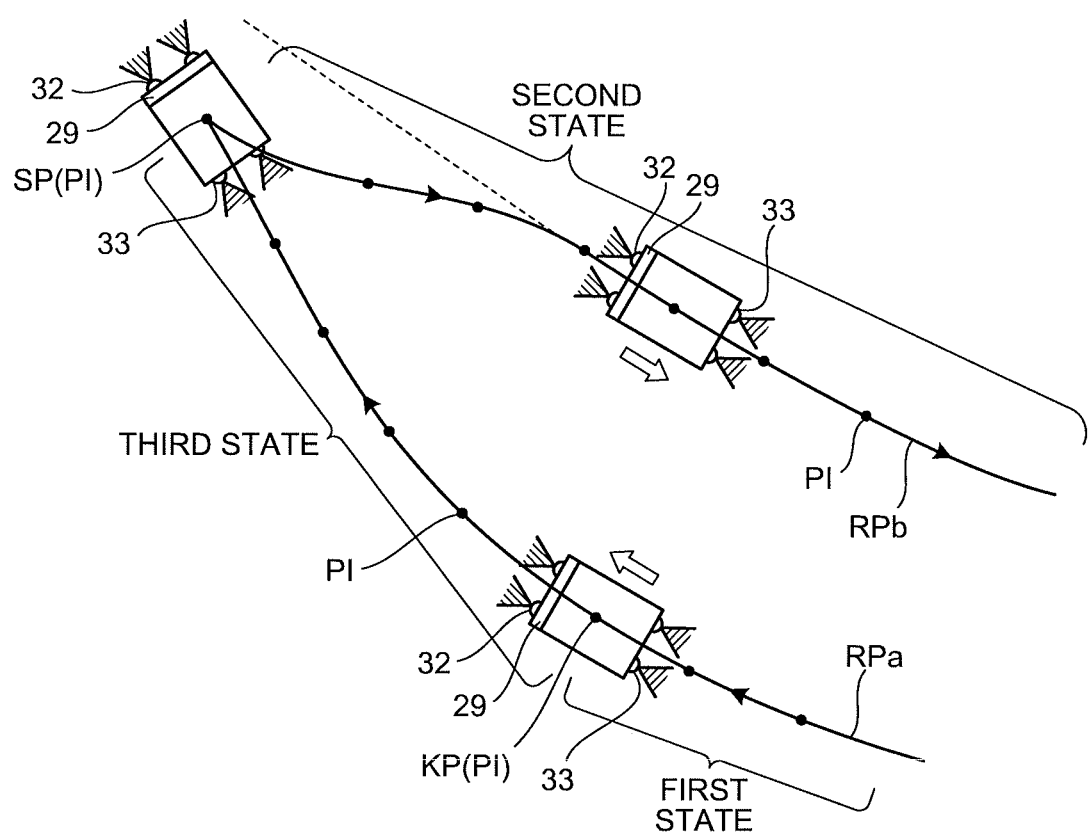
FIG. 11 is a schematic diagram for explaining a management method for a work vehicle according to a second embodiment.

FIG. 11 is a diagram schematically illustrating one example of a management method for the dump truck 2 according to the present embodiment. In the present embodiment, an operation of the notification device when the dump truck 2 switches back will be described.

The switchback is an operation in which the dump truck 2 moving forward changes the moving direction to start moving backward without changing the front and rear direction of the dump truck 2, or an operation in which the dump truck 2 moving backward changes the moving direction to start moving forward without changing the front and rear direction of the dump truck 2.

There is a case where the dump truck 2 is switched back in the workplace PA or the conveying path HL. In the case of switching back the dump truck 2, the traveling condition data generation unit 111 generates traveling condition data including command data for switching back the dump truck 2.

In the present embodiment, the notification data generation unit 112 generates notification data such that the notification device operates in a third state between a switchback position SP where the switchback is performed and a defined position KP away from the switchback position SP by a defined distance. In a case where the dump truck 2 switches back so as to move backward after moving forward, the defined position KP is defined in a forward section of the dump truck 2. In a case where the dump truck 2 switches back so as to move forward after moving backward, the defined position KP is defined in a backward section of the dump truck 2. That is, immediately before the dump truck 2 switches back, the notification data generation unit 112 generates the notification data such that the notification device operates in the third state different from the first state and the second state.

FIG. 11 illustrates an example in which the dump truck 2 traveling forward according to the first traveling route RPa switches back at the switchback position SP and then travels backward according to the second traveling route RPb. The defined position KP is defined in the first traveling route RPa that is the forward section of the dump truck 2. The defined position KP is defined by a specific course point PI. The switchback position SP is also defined by a specific course point PI.

In a section before the dump truck 2 passes through the defined position KP, the illumination lamp 32 and the illumination lamp 33 are lit in the first state (first lighting state). In the first lighting state, for example, the illumination lamp 32 emits yellow continuous light and the illumination light 33 emits red continuous light.

When the dump truck 2 passes through the defined position KP, the lighting state of the illumination lamp 32 and the illumination lamp 33 changes from the first state (first lighting state) to the third state (third lighting state). In a section between the defined position KP and the switchback position SP, the illumination lamp 32 and the illumination lamp 33 are lit in the third state (third lighting state). The third lighting state is an operation different from the first lighting state and the second lighting state. In the third lighting state, for example, the illumination lamp 32 emits yellow blinking light and the illumination light 33 emits red blinking light.

The dump truck 2 switches back at the switchback position SP. In a section after the dump truck 2 passes through the switchback position SP, the illumination lamp 32 and the illumination lamp 33 are lit in the second state (second lighting state). In the second lighting state, for example, the illumination lamp 32 emits red continuous light and the illumination light 33 emits yellow continuous light.

As described above, in the present embodiment, in the section immediately before the switchback is performed, the notification device operates in the third state different from the first state and the second state. As a result, an operator of a manned vehicle around the dump truck 2 or a worker working at a mine can recognize that the moving direction of the dump truck 2 is about to be changed. Therefore, work in the mine is smoothly carried out, and workability and productivity of the mine are improved.

Third Embodiment

A third embodiment will be described. In the following description, the same reference signs are given to constituent elements that are the same as or equivalent to those of the above embodiment, and the description thereof will be simplified or omitted.

Figure 12:
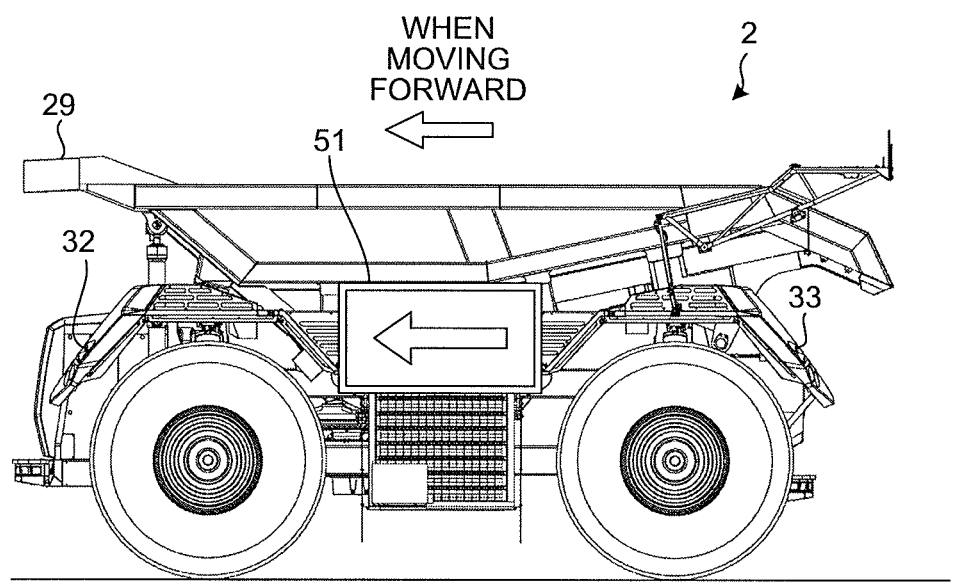
FIG. 12 is a schematic view for explaining a management method for a work vehicle according to a third embodiment.
Figure 13:
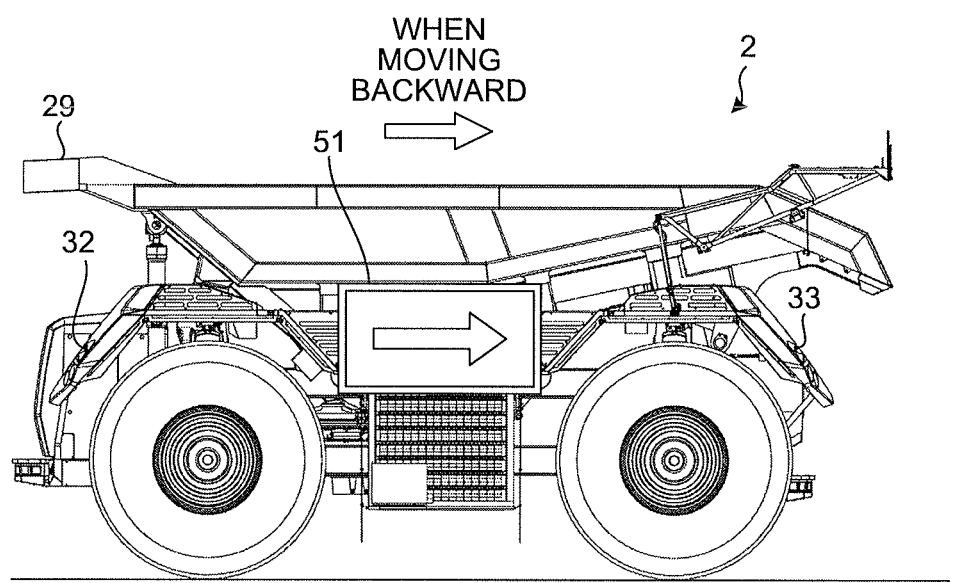
FIG. 13 is a schematic view for explaining the management method for a work vehicle according to the third embodiment.

FIGS. 12 and 13 are views schematically illustrating one example of a management method for the dump truck 2 according to the present embodiment. In the present embodiment, an example in which the notification device includes a display device 51 provided on the outer surface of the dump truck 2 will be described. The display device 51 includes a flat panel display such as a liquid crystal display (LCD) or an organic electroluminescence display (OELD). The display device 51 emits light and notifies the moving direction of the dump truck 2.

The display device 51 is provided at a position visually recognizable by an operator of a manned vehicle around the dump truck 2 or a worker working at a mine. In the examples illustrated in FIGS. 12 and 13, the display device 51 is provided on a side surface of the chassis 20 of the dump truck 2.

The notification data generation unit 112 generates display data that is to be displayed on the display device 51. The notification data generation unit 112 generates notification data such that the display data displayed on the display device 51 differs between forward movement and backward movement of the dump truck 2.

In the examples illustrated in FIGS. 12 and 13, at the time of forward movement of the dump truck 2, image data of an arrow indicating the moving direction of the dump truck 2 is displayed on the display device 51. In the examples illustrated in FIGS. 12 and 13, the direction of the arrow is displayed so as to face forward in the moving direction of the dump truck 2. At the time of backward movement of the dump truck 2, image data of an arrow indicating the moving direction of the dump truck 2 is displayed on the display device 51. Note that the image data is not limited to the arrows. In addition, the display data displayed on the display device 51 may include character data.

As described above, also in the present embodiment, the moving direction of the dump truck 2 is notified around the dump truck 2. The notification data generation unit 112 can optionally generate display data, and can notify the moving direction of the dump truck 2 in a variety of notification formats.

Fourth Embodiment

A fourth embodiment will be described. In the following description, the same reference signs are given to constituent elements that are the same as or equivalent to those of the above embodiment, and the description thereof will be simplified or omitted.

Figure 14:
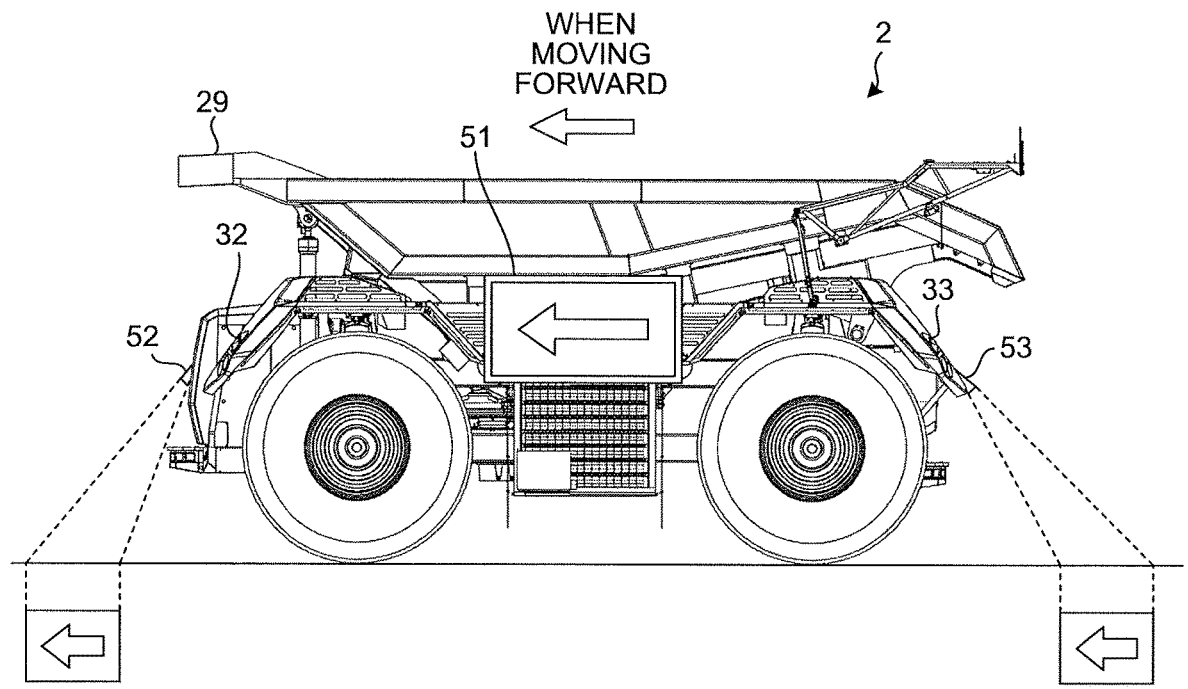
FIG. 14 is a schematic view for explaining a management method for a work vehicle according to a fourth embodiment.
Figure 15:
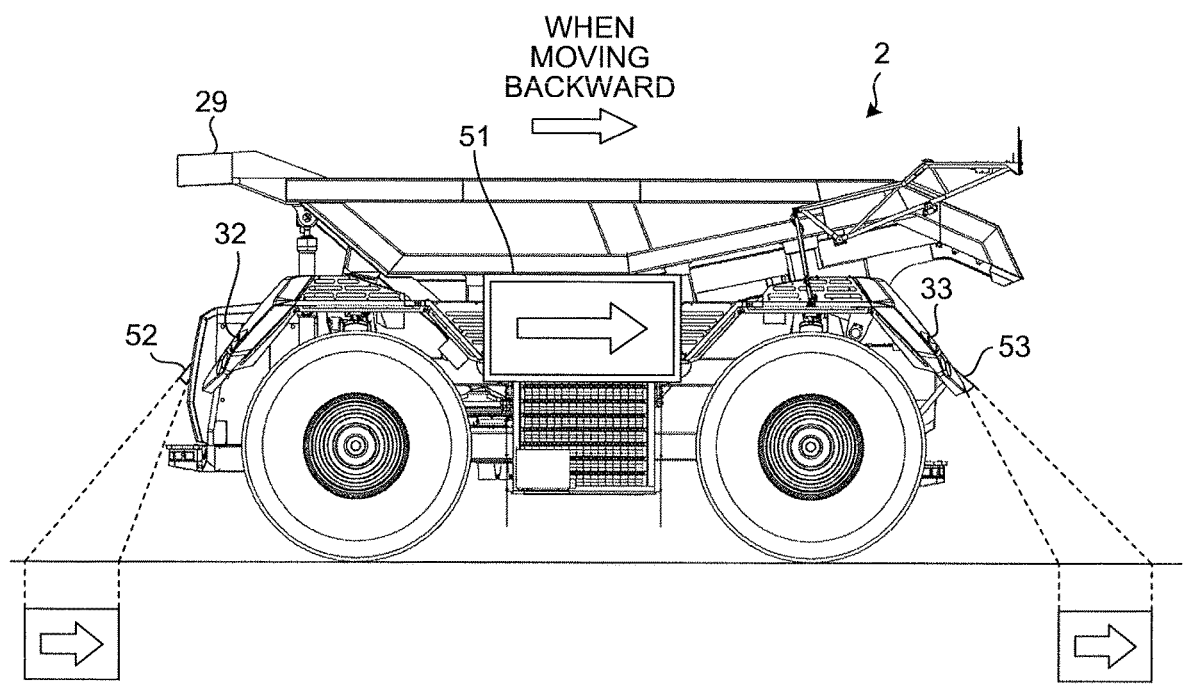
FIG. 15 is a schematic view for explaining the management method for a work vehicle according to the fourth embodiment.

FIGS. 14 and 15 are views schematically illustrating one example of a management method for the dump truck 2 according to the present embodiment. In the present embodiment, an example in which the notification device includes a projector 52 and a projector 53 that project an image on the ground on which the dump truck 2 travels will be described. The projector 52 and the projector 53 are projectors having a liquid crystal panel, or a light modulation element and a projection optical system such as a digital mirror device (DMD). The projector 52 and the projector 53 emit light to notify the moving direction of the dump truck 2.

The projector 52 is provided at the front portion of the dump truck 2. The projector 53 is provided at the rear portion of the dump truck 2. The projector 52 projects an image on the ground ahead of the dump truck 2. The projector 53 projects an image on the ground behind the dump truck 2.

The notification data generation unit 112 generates image data that is to be projected by the projector 52 and the projector 53. The notification data generation unit 112 generates notification data such that images projected by the ground differ between forward movement and backward movement of the dump truck 2.

In the examples illustrated in FIGS. 14 and 15, at the time of forward movement of the dump truck 2, an image of an arrow indicating the moving direction of the dump truck 2 is projected on the ground ahead of and behind the dump truck 2. At the time of backward movement of the dump truck 2, an image of an arrow indicating the moving direction of the dump truck 2 is projected on the ground ahead of and behind the dump truck 2. The projected image is not limited to the arrows. Furthermore, characters may be projected on the ground.

As described above, also in the present embodiment, the moving direction of the dump truck 2 is notified around the dump truck 2. The notification data generation unit 112 can optionally generate image data, and can notify the moving direction of the dump truck 2 in a variety of notification formats.

In the above embodiment, the functions of the traveling condition data generation unit 111, the notification data generation unit 112, and the position data acquisition unit 113 are included in the management apparatus 10. Part or all of the functions of the traveling condition data generation unit 111, the notification data generation unit 112, and the position data acquisition unit 113 may be included in the control apparatus 40 mounted on the dump truck 2.

In the above embodiment, it is assumed that the work vehicle is the dump truck 2 that operates in a mine. The work vehicle may operate in a wide-area work site separate from the mine.

REFERENCE SIGNS LIST

1 MANAGEMENT SYSTEM
2 DUMP TRUCK (WORK VEHICLE)
3 LOADING MACHINE
5 POSITIONING SATELLITE
6 REPEATER
7 CONTROL FACILITY
9 COMMUNICATION SYSTEM
10 MANAGEMENT APPARATUS
11 ARITHMETIC PROCESSING DEVICE
12 STORAGE DEVICE
13 INPUT/OUTPUT INTERFACE
14 WIRELESS COMMUNICATION DEVICE
15 INPUT DEVICE
16 DISPLAY DEVICE
20 CHASSIS
21 DUMP BODY
22 TRAVELING DEVICE
23 DRIVE DEVICE
24 RADIATOR
25 HOIST CYLINDER
26 WHEEL
26T TIRE
27 WHEEL
27T TIRE
28 HINGE MECHANISM
29 PROTRUSION
30 INCLINED SURFACE

31 POSITION DETECTOR
32 ILLUMINATION LAMP
33 ILLUMINATION LAMP
34 BRAKE DEVICE
35 STEERING DEVICE
36 OBSTACLE SENSOR
37 OBSTACLE SENSOR
40 CONTROL APPARATUS
41 ARITHMETIC PROCESSING DEVICE
42 STORAGE DEVICE
43 INPUT/OUTPUT INTERFACE
44 WIRELESS COMMUNICATION DEVICE
51 DISPLAY DEVICE
52 PROJECTOR
53 PROJECTOR
111 TRAVELING CONDITION DATA GENERATION UNIT
112 NOTIFICATION DATA GENERATION UNIT
113 POSITION DATA ACQUISITION UNIT
411 OPERATION CONTROL UNIT
412 ABSOLUTE POSITION DATA ACQUISITION UNIT
413 NOTIFICATION DEVICE CONTROL UNIT
CR CRUSHER
DPA DISCHARGING PLACE
HL CONVEYING PATH
IS INTERSECTION
LPA LOADING PLACE
PA WORKPLACE
RP TARGET TRAVELING ROUTE
RPa FIRST TRAVELING ROUTE
RPb SECOND TRAVELING ROUTE

The invention claimed is:

1. A management system for a work vehicle, the work vehicle controlling an operation thereof based on traveling condition data and comprising a notification device operable to provide notification of a moving direction of the work vehicle, the system comprising:
a traveling condition data generation unit implemented in a processor and configured to generate the traveling condition data of the work vehicle;
a notification data generation unit implemented in a processor and configured to generate notification data for controlling the notification device, based on the traveling condition data, such that the notification device operates in a first state at a time of forward movement of the work vehicle, and the notification device having operated in the first state operates in a second state different from the first state at a time of backward movement of the work vehicle; and
an output unit implemented in an input/output interface and configured to output the traveling condition data and the notification data to the work vehicle, wherein
the traveling condition data includes command data for effecting a switchback operation of the work vehicle,
the notification data generation unit is configured to generate the notification data such that the notification device operates in a third state between a switchback position where a switchback of the work vehicle is performed and a defined position separated from the switchback position by a defined distance
whereby the first state and the second state are based on directional movement and the third state is based on the defined position separated from the switchback position by the defined distance.

2. The management system for the work vehicle according to claim 1,
wherein the traveling condition data includes a plurality of course points set at constant intervals;
each of the plurality of course points includes target moving direction data of the work vehicle;
the notification data generation unit is further configured to set the notification data to each of the plurality of course points; and
the output unit is configured to output the traveling condition data including the plurality of course points respectively including the notification data, to the work vehicle.

3. The management system for the work vehicle according to claim 1,
wherein the notification device includes a first illumination lamp provided at a front portion of the work vehicle and a second illumination lamp provided at a rear portion of the work vehicle; and
the notification data generation unit is configured to generate the notification data such that a lighting state of the first illumination lamp and a lighting state of the second illumination lamp are different between the time of forward movement and the time of backward movement of the work vehicle.

4. A management method for a work vehicle, the work vehicle controlling an operation thereof based on traveling condition data and comprising a notification device operable to provide notification of a moving direction of the work vehicle, the method comprising:
generating the traveling condition data of the work vehicle;
generating notification data for controlling the notification device, based on the traveling condition data, such that the notification device operates in a first state at a time of forward movement of the work vehicle, and the notification device having operated in the first state operates in a second state different from the first state at a time of backward movement of the work vehicle; and
outputting the traveling condition data and the notification data to the work vehicle, wherein
the traveling condition data includes command data for effecting a switchback operation of the work vehicle,
generating the notification data such that the notification device operates in a third state between a switchback position where a switchback of the work vehicle is performed and a defined position separated from the switchback position by a defined distance,
whereby the first state and the second state are based on directional movement and the third state is based on the defined position separated from the switchback position by the defined distance.

* * * * *